(12) United States Patent
Rangaswamy et al.

(10) Patent No.: US 9,852,382 B2
(45) Date of Patent: Dec. 26, 2017

(54) DYNAMIC HUMAN WORKFLOW TASK ASSIGNMENT USING BUSINESS RULES

(75) Inventors: Ravi Rangaswamy, Fremont, CA (US); Will Stallard, Vallejo, CA (US); David C. Lam, Sunnyvale, CA (US); Sachin Sharma, Noida (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 12/780,356

(22) Filed: May 14, 2010

(65) Prior Publication Data

US 2011/0282709 A1 Nov. 17, 2011

(51) Int. Cl.
*G06Q 10/06* (2012.01)
*G06Q 10/10* (2012.01)
*G06Q 10/00* (2012.01)

(52) U.S. Cl.
CPC ......... *G06Q 10/06* (2013.01); *G06Q 10/0633* (2013.01); *G06Q 10/103* (2013.01)

(58) Field of Classification Search
USPC ............................. 705/7.27, 7.26, 7.21, 7.11
See application file for complete search history.

(56) References Cited

U.S. PATENT DOCUMENTS

| | | | |
|---|---|---|---|
| 5,721,913 A | 2/1998 | Ackroff | |
| 5,799,297 A * | 8/1998 | Goodridge et al. | |
| 5,930,512 A | 7/1999 | Boden | |
| 5,978,836 A | 11/1999 | Ouchi | |
| 5,999,911 A | 12/1999 | Berg | |
| 6,003,011 A | 12/1999 | Sarin | |
| 6,026,365 A | 2/2000 | Hayashi | |
| 6,161,113 A | 12/2000 | Mora | |
| 6,170,002 B1 | 1/2001 | Ouchi | |
| 6,308,224 B1 | 10/2001 | Leymann et al. | |
| 6,349,287 B1 | 2/2002 | Hayashi | |
| 6,397,182 B1 | 5/2002 | Cruickshank et al. | |
| 6,397,191 B1 | 5/2002 | Notani et al. | |
| 6,411,314 B1 | 6/2002 | Hansen | |
| 6,449,643 B1 | 9/2002 | Hyndman et al. | |

(Continued)

OTHER PUBLICATIONS

Kuleshov, "Human Task Allocation Manager" (2009) Exadel Inc. (http://exadelfs.com/knowledgebase/whitepapers/ExadellFS-Human-Tasks-Allocation-Manager-3-0.pdf), 5 pages.

(Continued)

*Primary Examiner* — Mark A Fleischer
(74) *Attorney, Agent, or Firm* — Tucker Ellis LLP

(57) ABSTRACT

A system and method for dynamic human workflow task assignment using business rules. In accordance with an embodiment, a human workflow system is integrated directly with business rules, to determine human task routing patterns, and participants in human tasks. Routing of tasks can also be determined by business rules. In accordance with an embodiment, at business process modeling time the workflow process designer creates human tasks in the process and specifies the business rules that determine the pattern, participant and routing information. These are integrated into the workflow task in the process. The integration of rules into human workflow can be performed using service component architecture, so that other rules engines can be plugged-in as required.

15 Claims, 6 Drawing Sheets

(56) References Cited

U.S. PATENT DOCUMENTS

| | | | |
|---|---|---|---|
| 6,470,227 B1 | 10/2002 | Rangachari et al. | |
| 6,507,845 B1 | 1/2003 | Cohen | |
| 6,519,642 B1 | 2/2003 | Olsen et al. | |
| 6,567,783 B1 | 5/2003 | Notani et al. | |
| 6,574,675 B1 | 6/2003 | Swenson | |
| 6,574,736 B1 | 6/2003 | Andrews | |
| 6,584,487 B1 | 6/2003 | Saboff | |
| 6,606,740 B1 | 8/2003 | Lynn | |
| 6,725,428 B1 | 4/2004 | Pareschi | |
| 6,742,015 B1* | 5/2004 | Bowman-Amuah | 718/101 |
| 6,792,604 B1 | 9/2004 | Hickson | |
| 6,889,231 B1 | 5/2005 | Souder | |
| 6,895,573 B2 | 5/2005 | Norgaard | |
| 6,970,844 B1 | 11/2005 | Bierenbaum | |
| 6,988,139 B1 | 1/2006 | Jervis | |
| 7,020,697 B1* | 3/2006 | Goodman et al. | 709/223 |
| 7,062,749 B2 | 6/2006 | Cyr et al. | |
| 7,080,099 B2 | 7/2006 | Tada | |
| 7,117,500 B2 | 10/2006 | Pulsipher | |
| 7,155,720 B2 | 12/2006 | Casati | |
| 7,236,939 B2 | 6/2007 | Chen et al. | |
| 7,266,764 B1 | 9/2007 | Flam | |
| 7,272,816 B2 | 9/2007 | Schulz et al. | |
| 7,284,265 B2 | 10/2007 | Choy et al. | |
| 7,289,966 B2 | 10/2007 | Ouchi | |
| 7,356,611 B1 | 4/2008 | Stork | |
| 7,370,335 B1 | 5/2008 | White et al. | |
| 7,379,945 B1 | 5/2008 | Hirsch et al. | |
| 7,403,989 B2 | 7/2008 | Beringer | |
| 7,406,432 B1 | 7/2008 | Motoyama | |
| 7,418,475 B2* | 8/2008 | Stewart et al. | 709/204 |
| 7,428,495 B2 | 9/2008 | Dhar | |
| 7,448,046 B2 | 11/2008 | Navani | |
| 7,464,366 B2 | 12/2008 | Shukla | |
| 7,493,593 B2 | 2/2009 | Koehler | |
| 7,498,866 B2 | 3/2009 | Choi | |
| 7,519,711 B2 | 4/2009 | Mohindra | |
| 7,543,292 B2 | 6/2009 | Haller et al. | |
| 7,603,674 B2 | 10/2009 | Cyr et al. | |
| 7,653,562 B2 | 1/2010 | Schulz | |
| 7,676,483 B2 | 3/2010 | Klug | |
| 7,680,683 B2 | 3/2010 | Hilerio | |
| 7,685,604 B2 | 3/2010 | Baartman | |
| 7,702,736 B2 | 4/2010 | Ouchi | |
| 7,774,827 B2 | 8/2010 | Kinser et al. | |
| 7,814,142 B2 | 10/2010 | Mamou | |
| 7,899,679 B2 | 3/2011 | MacKay | |
| 7,925,527 B1 | 4/2011 | Flam | |
| 7,937,406 B2 | 5/2011 | Shirin et al. | |
| 8,112,257 B2 | 2/2012 | Weber | |
| 8,146,083 B2 | 3/2012 | Aggarwal | |
| 8,170,897 B1 | 5/2012 | Cohen et al. | |
| 8,250,576 B2 | 8/2012 | Yildiz | |
| 8,321,257 B2 | 11/2012 | Motoyama | |
| 8,417,682 B2 | 4/2013 | Wilcox | |
| 8,793,807 B2 | 7/2014 | Claussen | |
| 9,020,831 B2 | 4/2015 | Simske | |
| 2002/0140731 A1* | 10/2002 | Subramaniam et al. | 345/762 |
| 2002/0178119 A1 | 11/2002 | Griffin | |
| 2002/0189070 A1 | 12/2002 | Noel et al. | |
| 2003/0046576 A1 | 3/2003 | High | |
| 2003/0079180 A1 | 4/2003 | Cope | |
| 2003/0105974 A1 | 6/2003 | Griffin | |
| 2003/0135384 A1* | 7/2003 | Nguyen | 705/1 |
| 2003/0154403 A1 | 8/2003 | Keinsley et al. | |
| 2003/0158832 A1 | 8/2003 | Sijacic | |
| 2004/0230466 A1 | 11/2004 | Davis | |
| 2004/0230594 A1 | 11/2004 | Flam et al. | |
| 2005/0027585 A1 | 2/2005 | Wodtke | |
| 2005/0049924 A1 | 3/2005 | DeBettencourt | |
| 2005/0071347 A1 | 3/2005 | Chau | |
| 2005/0097166 A1 | 5/2005 | Patrick | |
| 2006/0069995 A1 | 3/2006 | Thompson | |
| 2006/0074703 A1 | 4/2006 | Bhandarkar | |
| 2006/0074734 A1 | 4/2006 | Shukla | |
| 2006/0074915 A1 | 4/2006 | Bhandarkar | |
| 2006/0150156 A1 | 7/2006 | Cyr et al. | |
| 2006/0173869 A1 | 8/2006 | Byrne | |
| 2006/0218394 A1 | 9/2006 | Yang | |
| 2006/0224432 A1 | 10/2006 | Li | |
| 2006/0229925 A1 | 10/2006 | Chalasani et al. | |
| 2006/0259524 A1 | 11/2006 | Horton | |
| 2007/0016465 A1 | 1/2007 | Schaad | |
| 2007/0061382 A1 | 3/2007 | Davis | |
| 2007/0061776 A1* | 3/2007 | Ryan et al. | 717/105 |
| 2007/0156486 A1 | 7/2007 | Sanabria et al. | |
| 2007/0203589 A1 | 8/2007 | Flinn et al. | |
| 2007/0203881 A1* | 8/2007 | Schaad et al. | 707/1 |
| 2007/0239499 A1 | 10/2007 | Shukla | |
| 2007/0240112 A1 | 10/2007 | Haselden | |
| 2007/0240231 A1 | 10/2007 | Haswarey et al. | |
| 2007/0276715 A1 | 11/2007 | Beringer | |
| 2008/0065656 A1* | 3/2008 | Theeten et al. | 707/100 |
| 2008/0114627 A1 | 5/2008 | Baeuerle et al. | |
| 2008/0114791 A1 | 5/2008 | Takatsu | |
| 2008/0282250 A1 | 11/2008 | Marin | |
| 2008/0301684 A1 | 12/2008 | Barros | |
| 2008/0306806 A1 | 12/2008 | Van Wyk | |
| 2009/0031418 A1 | 1/2009 | Matsuda et al. | |
| 2009/0125366 A1 | 5/2009 | Chakraborty | |
| 2009/0164985 A1 | 6/2009 | Balko | |
| 2009/0199293 A1 | 8/2009 | Song et al. | |
| 2009/0249293 A1 | 10/2009 | Davies | |
| 2009/0260021 A1* | 10/2009 | Haenel et al. | 719/328 |
| 2009/0281865 A1 | 11/2009 | Stoitsev | |
| 2009/0307162 A1 | 12/2009 | Bui et al. | |
| 2009/0328205 A1 | 12/2009 | Ims et al. | |
| 2010/0049574 A1 | 2/2010 | Paul et al. | |
| 2010/0100427 A1 | 4/2010 | McKeown et al. | |
| 2010/0106546 A1 | 4/2010 | Sproule | |
| 2010/0131916 A1 | 5/2010 | Prigge | |
| 2010/0205013 A1 | 8/2010 | Guyan et al. | |
| 2010/0223570 A1 | 9/2010 | Gerstl | |
| 2010/0235213 A1 | 9/2010 | Channabasavaiah | |
| 2010/0251242 A1 | 9/2010 | Sivasubramanian | |
| 2011/0078499 A1 | 3/2011 | Fong et al. | |

OTHER PUBLICATIONS

Bradshaw, et al., Oracle® BPEL Process Manager Developer's Guide 10g(10.1.3.1.0), B28981-03, Oracle, Jan. 2007, 295 pages.
Beecher, Oracle Fusion Middleware Developer's Guide for Oracle SOA Suite, 11g, Oracle, Dec. 2009, 374 pages.
Fogel, Oracle® Database Administrator's Guide, 11g Release 1 (11.1), B28310-04, Mar. 2008, 40 pages.
Oracle BPEL Process Manager—Data Sheet, Oracle 2009, 4 pages.
Rittman, Oracle Purchases Collaxa, Launchs Oracle BPEL Process Manager, RittmanMead.com, Jun. 30, 2004, 7 pages.
Clugage, The Oracle BPEL Process Manager: BPEL + Human Workflow, Oracle, Mar. 14, 2006, 10 pages.
BPEL4People—WikiPedia Definition, Wikipedia.org., Retrieved Apr. 10, 2012, 3 pages.
Collaxa WSOS 2.0: An Introduction, Collaxa, Sep. 6, 2002, 23 pages.
Kennedy, Oracle® BPEL Process Manager Quick Start Guide 10g (10.1.3.1.0), Oracle, Sep. 2006, 60 pages.
Liu, Business Process Automation and Web Service Choreography, Technische Universitat Hamburn-Hamburg, Jun. 29, 2004, 43 pages.
Collaxa, Orchestration Server Developer's Guide Version 2.0, Beta 2, Collaxa, 2002, 242 pages.
Kloppmann, et al., WS-BPEL Extension for Sub-processes—BPEL-SPE, A Joint White Paper by IBM and SAP, Sep. 2005, 17 pages.
Agrawal, et al., Web Services Human Task (WS-Human Task), Version 1.0, Active Endpoints, Inc., Jun. 2007, 133 pages.
Agrawal, et al., WS-BPEL Extension for People (BPEL4 People), Version 1, Active Endpoints, Inc., Jun. 2007, 52 pages.
Kloppmann, et al., WS-BPEL Extension for People—BPEL4People, IBM, SAP, White Paper, Jul. 2005.
Workflow Management Coalition Workflow Standard—Interoperability Abstract Specification, The Workflow Management Coalition Specification, Version 2.0b, Nov. 30, 1999.

(56) References Cited

OTHER PUBLICATIONS

Unknown Author, TrackWise User's Guide, 2000, Sparta Systems, Inc.
Oracle International Corporation, Oracle SOA Suite Developer's Guide 10g, 7.12 Creating a Human Workflow Task, 2006, 8 pages.
Oracle International Corporation, Oracle BPEL Process Manager, Quick Start Guide, 10g, Sep. 2006, 60 pages.
Oracle International Corporation, Oracle Workflow Developer's Guide, Release 12, Dec. 2006, 508 pages.
United States Patent and Trademark Office, Notice of Allowance dated May 22, 2017 for U.S. Appl. No. 12/780,183, 10 pages.
United States Patent and Trademark Office, Office Action dated Jun. 15, 2017 for U.S. Appl. No. 12/780,340, 31 pages.

* cited by examiner

DYNAMIC HUMAN WORKFLOW TASK ASSIGNMENT USING BUSINESS RULES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, which are each hereby incorporated by reference in their entirety:

U.S. patent application Ser. No. 12/780,183, titled "SYSTEM AND METHOD FOR PROVIDING COMPLEX ACCESS CONTROL IN WORKFLOWS", inventors Vladimir Svetov et al., filed May 14, 2010;

U.S. patent application Ser. No. 12/780,340, titled "INTEGRATING EXTERNAL DATA IN HUMAN WORKFLOW TASKS", inventors Ravi Rangaswamy et al., filed May 14, 2010;

U.S. patent application Ser. No. 12/780,661, titled "FLEXIBLE CHAINING OF DISPARATE HUMAN WORKFLOW TASKS IN A BUSINESS PROCESS", inventors Ravi Rangaswamy et al., filed May 14, 2010;

U.S. patent application Ser. No. 12/780,348, titled "WORKFLOW TASK ROUTING BASED ON CARDINALITY OF TASK DATA", inventors Ravi Rangaswamy et al., filed May 14, 2010; and U.S. patent application Ser.No. 12/780,214, titled "SYSTEM AND METHOD FOR LOGICAL PEOPLE GROUPS", inventors Ravi Rangaswamy et al., filed May 14, 2010.

FIELD OF INVENTION

The present invention is generally related to software modeling and development, and to business and human workflows, and is particularly related to a means of dynamic human workflow task assignment using business rules.

BACKGROUND

In software development, a service oriented architecture (SOA) composite application is an assembly of services, service components and references, which are designed and deployed together to meet a particular business need. SOA allows for the development of enterprise applications as modular business web services that can be easily integrated and reused. To rapidly respond to competitors, and best exploit organizational assets, many companies have adopted SOA to accommodate their complex application environments.

Products such as Oracle SOA Suite provide a complete set of service infrastructure components for designing, deploying, and managing composite applications, including allowing services to be created, managed, and orchestrated into composite applications and business or workflow processes. In addition to modeling automated or application-controlled business workflows, products such Oracle SOA Suite can also be used to model human workflows, i.e. those tasks or actions which must be performed by human users within an organization, such as reviewing a particular set of data, or approving a particular set of purchase orders or invoices. Generally, speaking such products include a graphical user interface or similar interface, that allows a process designer to modify the human workflow, to suit the needs of the organization.

Many automated business process or workflow processes use externalized business rules to determine participants in human workflow tasks in the processes. Similarly business rules can also determine the task routing logic. For example, in an expense approval process a business rule can determine the assignees and the workflow task pattern like sequential, parallel approval based on the expense amount. These rules can also determine that any of the participant approves, the task has to sent to the previous approver for review again. However, integrating these business rules in the human workflow tasks is a challenge, because these rules are often called separately from the human workflow task assignment. This requires customers to create complex data and process flow manipulation in process flow languages like BPEL to achieve the integration. This introduces restrictions, errors and process maintenance issues for customers. Secondly modeling complex workflow task routing like review by previous approver, etc. is left to the process modeler and these are not easily implemented. This is the general area that embodiments of the invention are intended to address.

SUMMARY

Described herein is a system and method for dynamic human workflow task assignment using business rules. In accordance with an embodiment, a human workflow system is integrated directly with business rules, to determine human task routing patterns, and participants in human tasks. Routing of tasks can also be determined by business rules. In accordance with an embodiment, at business process modeling time the workflow process designer creates human tasks in the process and specifies the business rules that determine the pattern, participant and routing information. These are integrated into the workflow task in the process. The integration of rules into human workflow can be performed using service component architecture, so that other rules engines can be plugged-in as required.

DETAILED DESCRIPTION

Figure 1:
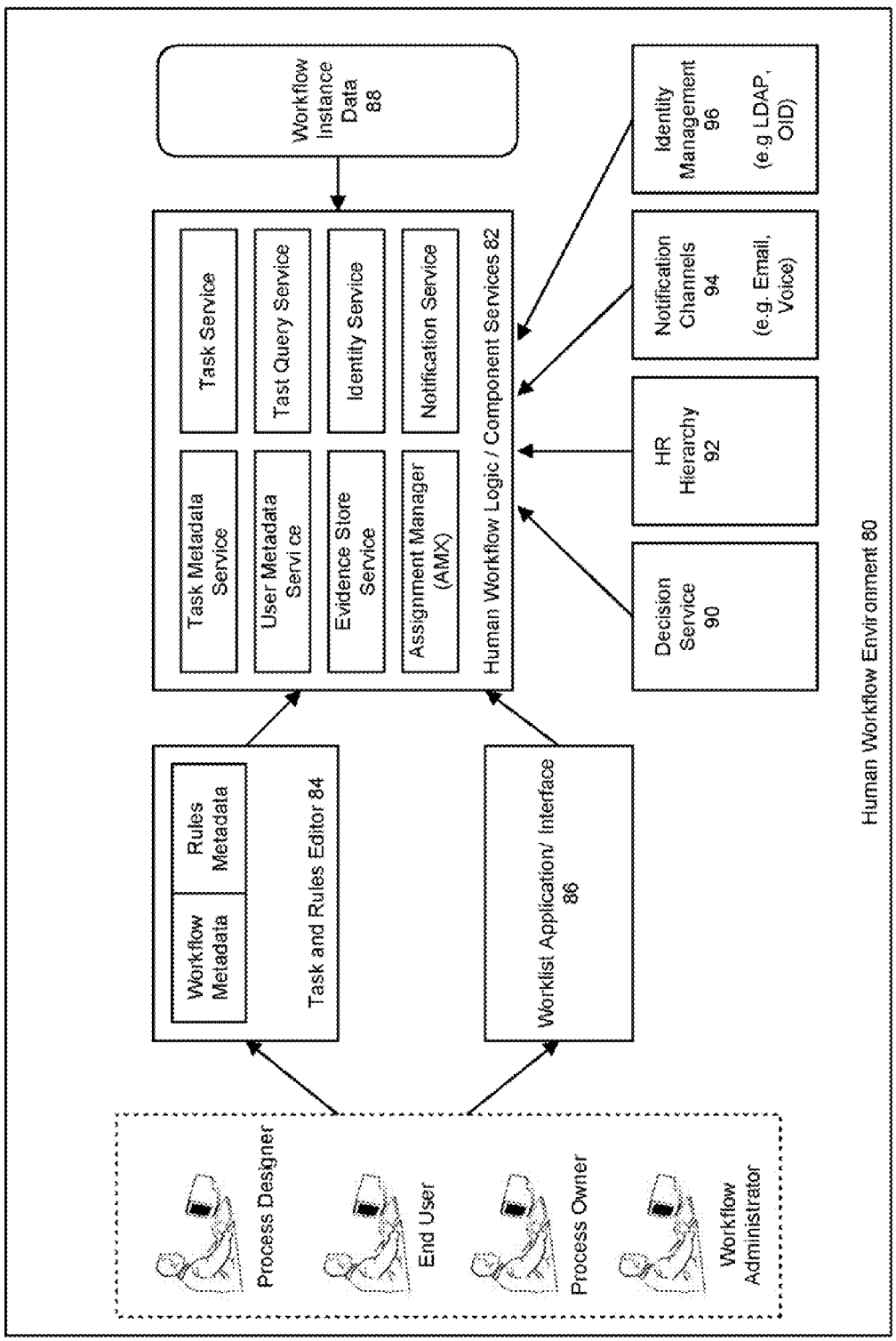
FIG. 1 shows an illustration of a human workflow environment in accordance with an embodiment.

Products such as Oracle SOA Suite provide a complete set of service infrastructure components for designing, deploying, and managing composite applications, including allowing services to be created, managed, and orchestrated into composite applications and business or workflow processes. In addition to modeling automated or application-controlled business workflows, products such Oracle SOA Suite can also be used to model human workflows, i.e. those tasks or actions which must be performed by human users within an organization, such as reviewing a particular set of data, or approving a particular set of purchase orders or invoices. Generally, speaking such products include a graphical user interface or similar interface, that allows a process designer to modify the human workflow, to suit the needs of the organization.

A problem with current techniques is that business process workflow modelers must model their business rules separately from human workflow task assignment, and then perform data manipulation to achieve proper task assignment. Similarly, to achieve rule based routing, a complex process flow must be designed.

Described herein is a system and method for dynamic human workflow task assignment using business rules. In accordance with an embodiment, a human workflow system is integrated directly with business rules, to determine human task routing patterns, and participants in human tasks. Routing of tasks can also be determined by business rules. In accordance with an embodiment, at business process modeling time the workflow process designer creates human tasks in the process and specifies the business rules that determine the pattern, participant and routing information. These are integrated into the workflow task in the process. The integration of rules into human workflow can be performed using service component architecture, so that other rules engines can be plugged-in as required.

Advantages of this approach include that the business rules can be abstracted from the modeling of the business process and human workflow, so that users with different roles, such as IT developers, business analysts, etc. can perform different tasks. in a typical enterprise environment, the information technology (IT) users model the overall business process, while the business analysts model the business rules, and clarify where roles matter in the context of the human workflow. A workflow task can comprise multiple participants in various patterns, and different business rules engines can be used. Enabling business rules integration at each of these levels allows visibility into which rules are used for which workflow task activities. Different business rules can be associated with different task activities. The approach also allows for separation of responsibility of various users.

Glossary of Terms

Several terms which are used throughout this application are described below. It will be evident that, in accordance with different embodiments, different technologies (such as different web service languages, etc) can be used as appropriate. Additionally, in the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Business Process, Business Workflow Process

In accordance with an embodiment, a business process or business workflow process is an automated software process, defined by a process developer, which then executes within an organization, including utilizing or drawing upon other software or other organizational resources.

Human Workflow Process

In accordance with an embodiment, a human workflow process is an automated software process, similarly defined by a process developer, which defines those tasks or actions within an organization which must be performed by human users within the organization, such as approving a particular task, or reviewing a particular set of data.

Business Process Language (e.g. BPEL, BPMN, BPM)

In accordance with an embodiment, a language such as BPEL, BMPN, or BPM can be used for business process orchestration and execution. Using such a language, a developer can design a business process that integrates a series of discrete services into an end-to-end process flow.

Service Component Architecture (SCA)

In accordance with an embodiment, an architecture such as SCA provides the service details and interdependencies to form composite applications, and enables a developer to represent business logic as reusable service components.

Web Services Description Language (WSDL)

In accordance with an embodiment, a language such as WSDL provides the entry points into an SOA composite application, inasmuch as a WSDL file can provide a standard contract language for understanding the capabilities of a service.

Service Data Object (SDO)

In accordance with an embodiment, an SDO specifies a standard data method that can modify business data regardless of how it is physically accessed. Knowledge is not required about how to access a particular back-end data source to use SDO in an SOA composite application. In accordance with an embodiment, an SDO can be structured XML, and can be passed as static XML through a task payload.

List Builders

In accordance with an embodiment, each approval stage within a human workflow process comprises one or more list builders that determine the actual list of approvers, or uses who will be assigned tasks. Examples of the types of list builders that can be used include: Names and Expressions, which construct a list using static names, or names coming from XPath expressions; Approval Groups, which include predefined approver groups in the approver list; Job Level, which ascend a supervisory hierarchy, starting at a given approver and continuing until an approver with a sufficient job level is found; Position, which ascend a position hierarchy, starting at the requester's or at a given approver's position, and goes up a specified number of levels or to a specific position; Supervisory, which ascends the primary supervisory hierarchy, starting at the requester or at given approver, and generates a chain that has a fixed number of approvers in it; Management Chain, which are based on management relationships in the corresponding user directory; and Rule-based.

Task

In accordance with an embodiment, a task handles approvals. A different task is created for each approval requirement based on the business served by it, for example, an "approve new expense report" task or an "approve new purchase order" task. Tasks can be associated with metadata, for example task attributes such as title, outcomes (approve, reject, etc.) priority, expiration; task parameters that may be based on simple primitive types, XML elements, or external entities such as ADF view objects. Tasks can also be associated with a task payload or other data or information. A complex approval task that may include one or more stages to identify the key milestones within an approval sequence.

Collections

In accordance with an embodiment, a collection is defined as an entity parameter for a task, and enables access to a portion of the entity, for example as an XML fragment retrieved by an XPATH expression. Once defined, collections can be associated with stages to identify a stage as acting on a collection. Defining a collection involves defining the name of the collection and the XPath to the collection element.

Stages

In accordance with an embodiment, a stage is a set of approvals related to a collection. The same collection can be associated with multiple approval stages. A compound approval may consist of multiple stages and then can be modeled in serial or parallel with each other. Each stage consists of list builders to determine the list of approvers. Optionally, each list builder can be associated with an approval policy, that is, a set of rules. At runtime, the appropriate set of approvals are returned based on the list builders used within the stage and on the associated policies.

Business Rules for Approval

In accordance with an embodiment, approvers of a task can be defined either inline in a task definition, or by using business rules to specify the list builders that identify the approvers of the task. Business rules can also be used to specify approver substitution and list modifications. Typically, business rules are defined by the organization or the customer, and are a combination of conditions and actions. Optionally, priority and validity periods can also be defined for the rules. In the context of the human workflow process, rule conditions can be defined using fact types that correspond to the task, and to the task message and entity attributes (which are XML representations of SDO objects). Rule actions can consist of approver list builders and their parameters. Approver list builders can then move up a particular hierarchy and construct or modify the approver list according to the parameters defined.

FIG. 1 shows an illustration of a human workflow environment 80 in accordance with an embodiment.

Many end-to-end business or workflow processes require human interactions with the process. For example, humans may be needed for approvals, exception management, or performing activities that are required to advance the business process. In accordance with an embodiment, the human workflow environment provides features such as: human interactions with processes, including assignment and routing of tasks to the correct users or groups; deadlines, escalations, notifications, and other features required for ensuring the timely performance of a task (human activity); presentation of tasks to end users through a variety of mechanisms, including worklist applications; organization, filtering, prioritization, and other features required for end users to productively perform their tasks; and reports, reassignments, load balancing, and other features required by supervisors and business owners to manage the performance of tasks.

As shown in FIG. 1, in accordance with an embodiment, the environment can include a human workflow logic and/or a set of component human workflow services 82, such as Approval Management extensions (AMX). The human workflow service is responsible for handling all interactions with users or groups participating in the business process, which it does by creating and tracking tasks for the appropriate users in the organization. Users typically access tasks through a variety of clients, e.g. worklist applications, email, portals, or custom applications. AMX allows a process designer to define complex task routing slips for human workflow by taking into account business documents and associated rules to determine the approval hierarchy for a work item. Additionally, AMX allows the process designer to define multi-stage approvals with associated list builders based on supervisor or position hierarchies. The approval tasks can be designed in a Human Task Editor, and then associated with a BPEL process.

The human workflow service handles requests based on task and rules metadata 84, which can be modified using a worklist application/interface 86. Core components required for approval management can include:

Human Task Editor—used to define the metadata for a human task and the routing slip. The task editor lets the process designer define such things as task parameters, outcomes, expiration and escalation, and notification settings, such as defining multi-stage approvals and associated approval list builders; or determining the approval hierarchy based on business documents (i.e. ADF objects) and business rules.

Human workflow services—which include for example a Task Service responsible for creating and managing tasks in the dehydration store; Identity Service responsible for authentication and authorization of users and groups. The service can look up various user directories for authorization and contact information for users; as Task Query Service responsible for retrieving tasks for the web-based worklist application; and a Decision Service responsible for executing business rules related to approvals.

Worklist Application—a web-based application that lets users access tasks assigned to them and perform actions based on their roles in the approval process. The worklist supports profiles such as Work assignee—an end user who is assigned a task. These users can view tasks assigned to them and perform actions, and also can define custom views and define routing rules for their tasks; Process owner—typically a business analyst responsible for managing certain types of approvals. These users can manage tasks for the processes they own, define approval groups, and change approval policies; Workflow administrator—typically a system administrator responsible for managing errored tasks, and administering and monitoring work queues. This user also may use Oracle Enterprise Manager to monitor the health of the workflow services.

Workflow instance data 88 can be stored within the system and used as part of the workflow process. The system can also retrieve information from, or provide information to, other services such as a decision service 90, HR service 92, notification channel 94, or identity management service 96. It will be evident that the above environment is an example of the type of environment in which human workflow can be used, and that in accordance with other embodiments different or additional components and services can be included.

Figure 2:
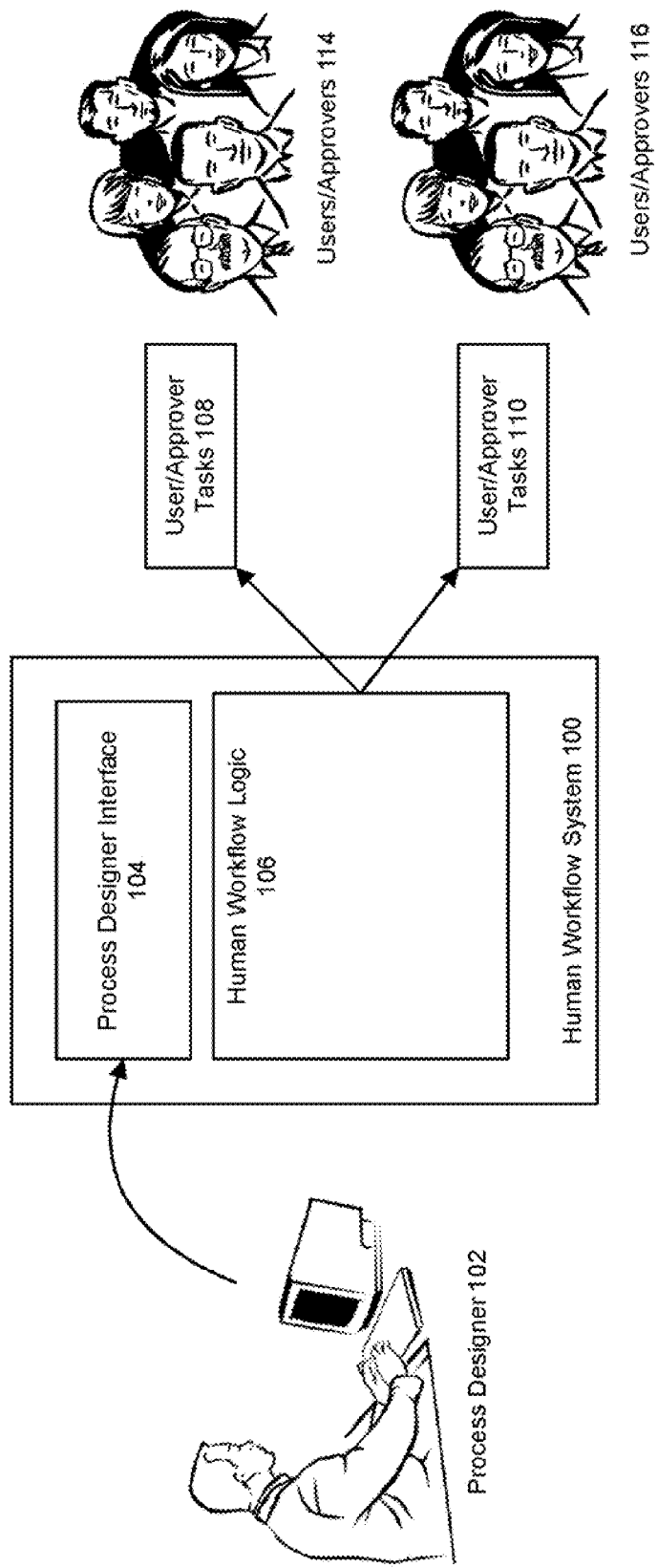
FIG. 2 shows an illustration of a human workflow system as it may be used by a process designer to assign tasks to users, in accordance with an embodiment.

FIG. 2 shows an illustration of a human workflow system as it may be used by a process designer to assign tasks to users, in accordance with an embodiment. As shown in FIG. 2, in accordance with an embodiment, the human workflow system 100 includes a process design interface 104, such as a graphical user interface and/or a plurality of different editors and menu options. The human workflow system further includes a human workflow logic 106, such as software that executes on a processor and that executes the human workflow as designed or configured with the process design interface. A process designer or developer 102 can use the process design interface to develop and deploy human workflow processes to the system, for execution by the human workflow logic. As the workflow process executes, tasks 108, 110, such as workflow approval tasks are generated and assigned to different users/approvers 114, 116, for their involvement, such as approving a particular action, e.g. a purchase order.

Figure 3:
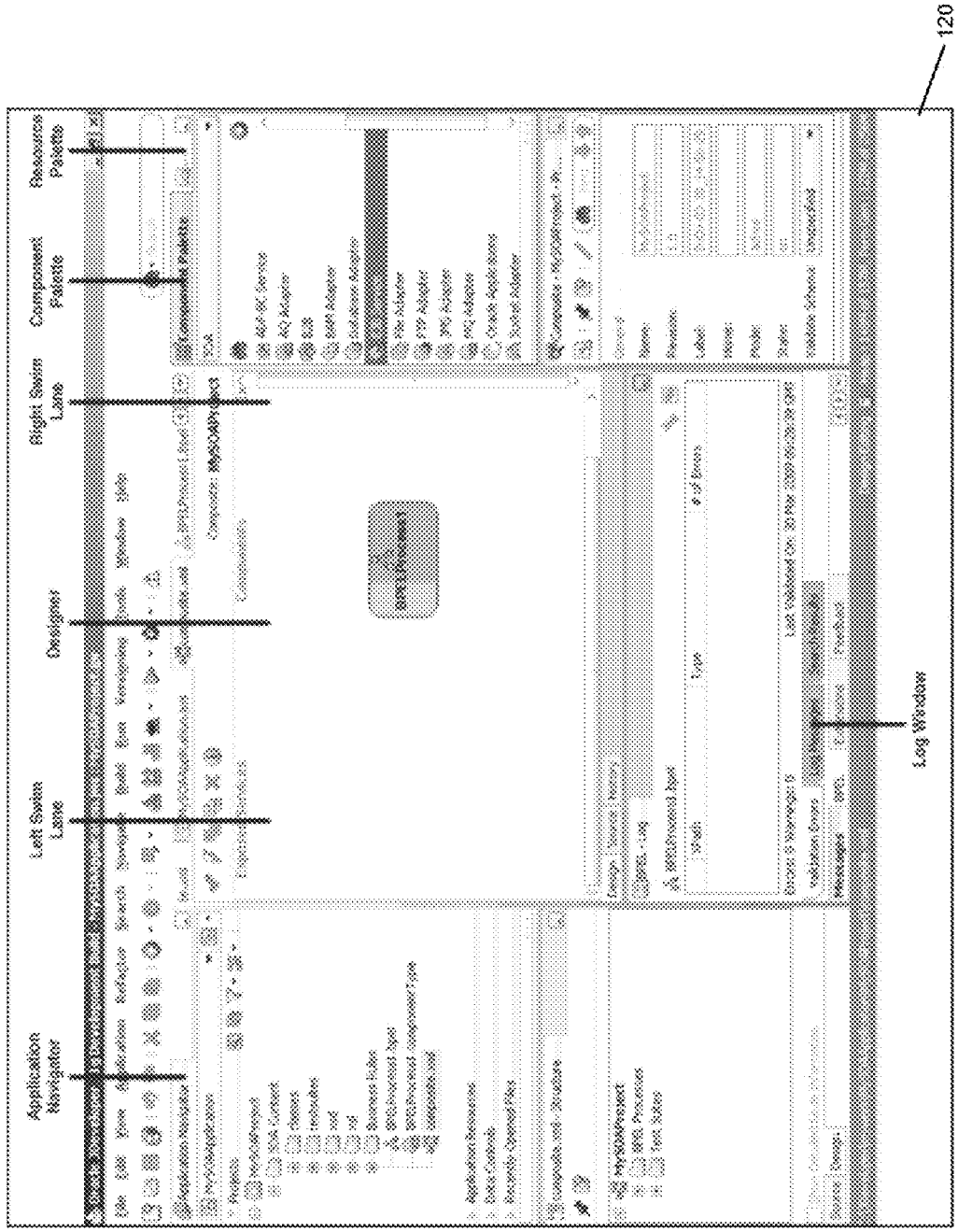
FIG. 3 shows a screenshot of a typical process design interface, as it may be used with a human workflow system or environment, in accordance with an embodiment.

FIG. 3 shows a screenshot of a typical process design interface or editor, as it may be used with a human workflow system or environment, in accordance with an embodiment. As shown in FIG. 3, a design interface or editor 120 enables the process designer to create, edit, and deploy services, and also to assemble them in a composite application. These components are integrated together into one application and communicate with the outside world through binding components, such as web services and JCA adapters.

For example, as shown in the example of FIG. 3, a process designer can drag and drop components and service adapters from the Components Palette window to the Designer window. When they drop a service component into the Designer window, it starts a property editor for configuring that service component. For example, when they drop a Mediator component into the Designer window, this also opens the Mediator editor window that enables the designer to configure the Mediator. Service components, services, and references can be dragged into the composite in the designer, in which case a corresponding property editor is invoked for performing configuration tasks related to that service component. A left "swim lane" is provided for services providing an entry point to the SOA composite application, such as a web service or JCA adapters. A right "swim lane" is provided for references that send messages to external services in the outside world, such as web services and JCA adapters. The Component Palette contains the various resources that can be used in a SOA composite, such as service components, which displays the BPEL Process, business rule, human task, and mediator service that can be dragged and dropped into the designer; Service adapters, which displays the JCA adapter (AQ, file, FTP, Database, JMS, MQ, Oracle Applications, Oracle BAM, and EJB Service), B2B binding component, SDO binding component, and web service binding component that can be dragged into the left or right swim lanes.

It will be evident that the above process design interface or editor is an example of the type of process design interface or editor in which human workflow can be used, and that in accordance with other embodiments different or process design interfaces or editors can be included.

Figure 4:
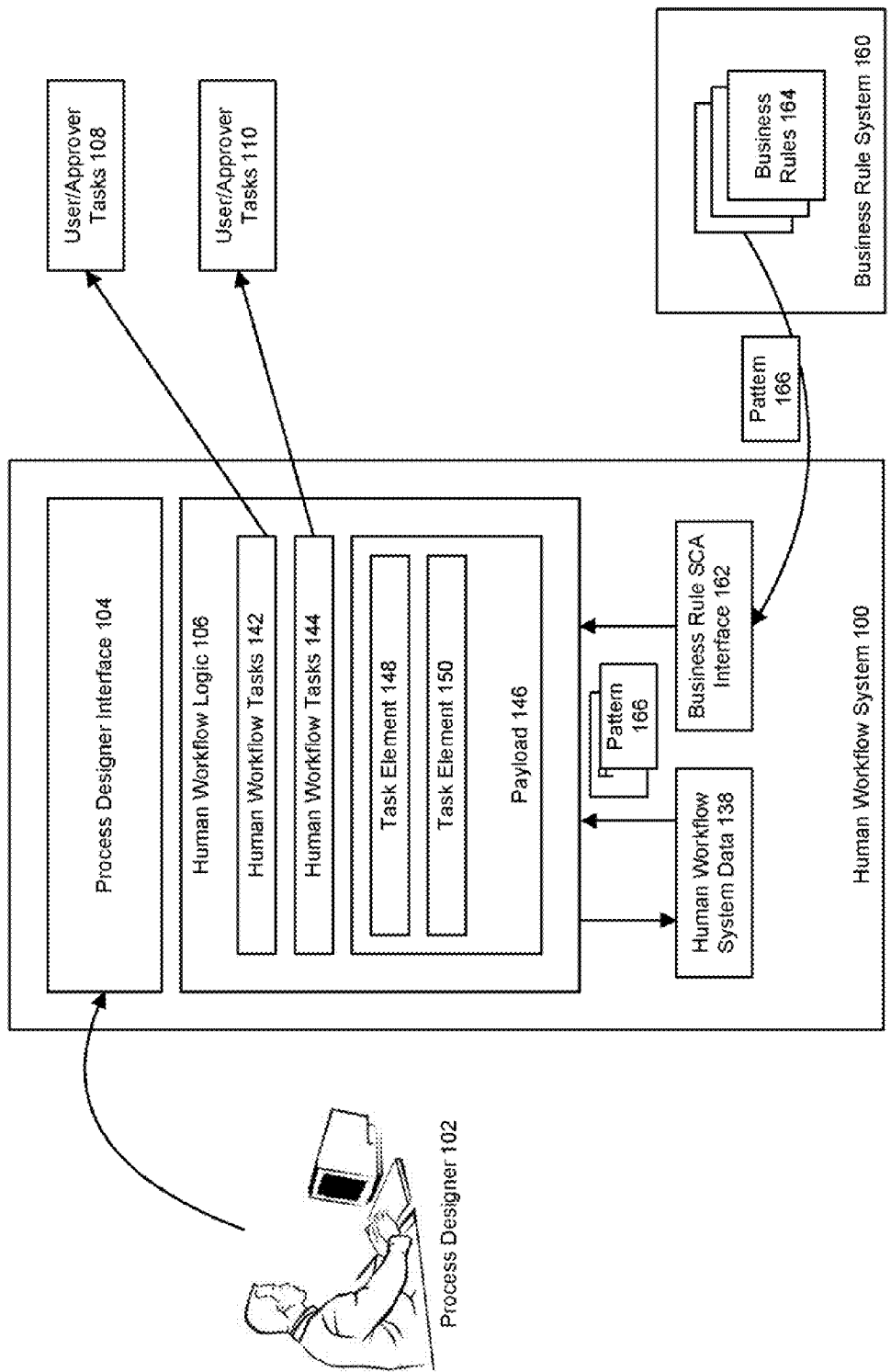
FIG. 4 shows an illustration of a human workflow system that includes a means of dynamic human workflow task assignment using business rules in accordance with an embodiment.

FIG. 4 shows an illustration of a human workflow system that includes a means of dynamic human workflow task assignment using business rules, in accordance with an embodiment.

As shown in FIG. 4, and described above, the human workflow system 100 can include a process design interface 104 and human workflow logic 106, which allows a process designer or developer 102 to develop and deploy human workflow processes or patterns to the system, for execution by the human workflow logic. As the workflow process executes, tasks such as approval tasks 108, 110, are assigned to different users/approvers 114, 116.

In accordance with an embodiment, the workflow system can include workflow system data 138, such as patterns, that can be associated with a plurality of workflow tasks 142, 144 managed by the system. Tasks can include a plurality of task elements 148, 150, and can be associated with a payload 146. The payload can be considered the real-time data which is necessary to complete the task, such as approval of the line items of a purchase order, or the identification of the person who must approve such a purchase order. The contents of the payload can be provided when the task is first created, and can be statically retrieved from the workflow system data, or can be modified during the workflow process. The payload as modified can then travel with the task as it is assigned to the users responsible for completing the task.

A problem with current techniques is that business process workflow modelers must model their business rules separately from human workflow task assignment, and then perform data manipulation to achieve proper task assignment.

In accordance with an embodiment, the workflow logic and/or payload information can be modified by making calls to or receiving information from an external business rules system 160. This allows an organization to integrate their (e.g. currently existing, or maintained independently) business rules within their human workflow processes. In accordance with an embodiment, a business rule SCA interface 162 allows the plugin of one or a plurality of business rules systems specified by those rules systems. Each business rules system can then use these rules to determine or to affect the patterns 166 used within the human workflow, and in effect to contribute its own business rules 164 to the human workflow environment.

Figure 5:
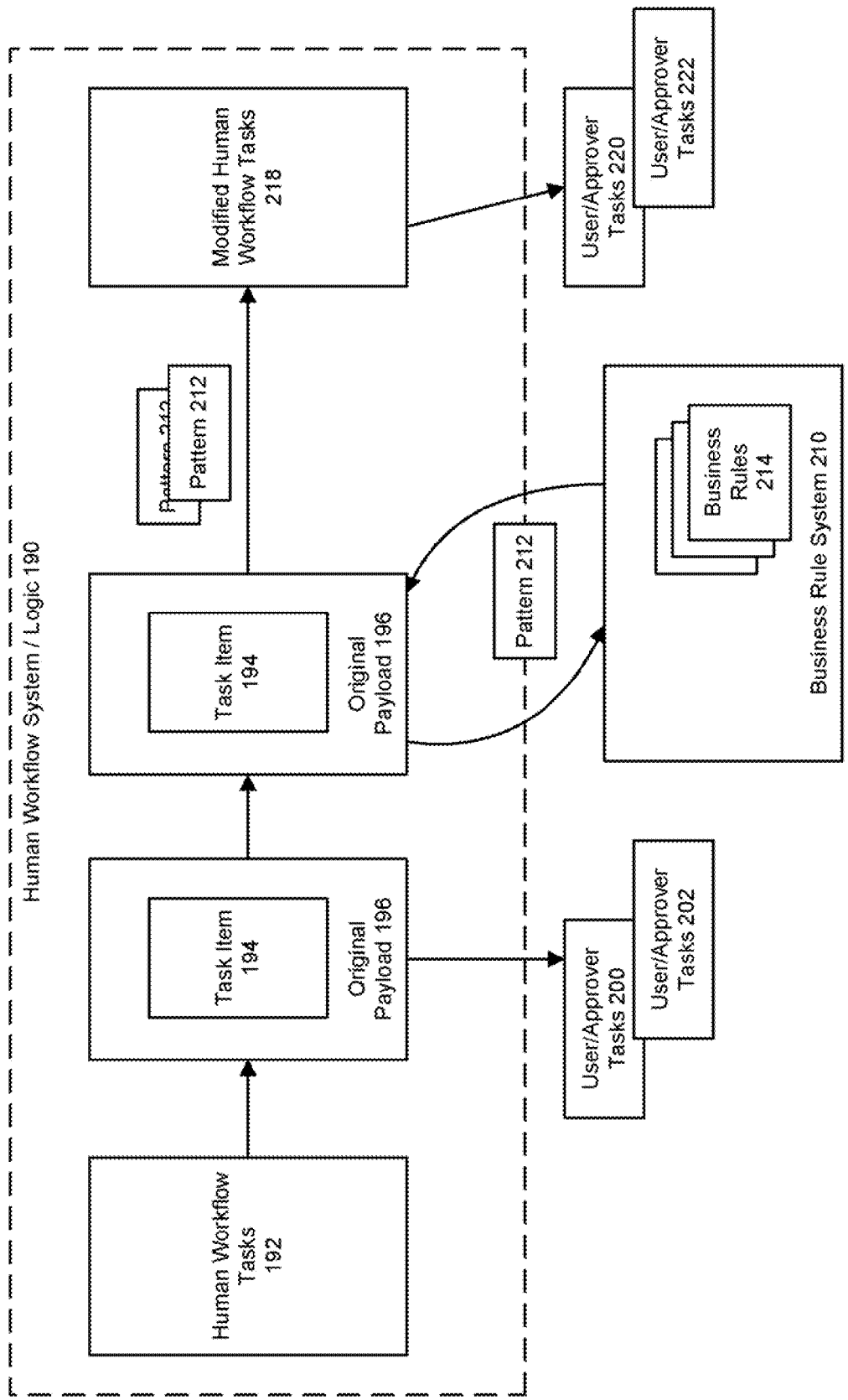
FIG. 5 shows an illustration of a human workflow system that incorporates dynamic human workflow task assignment using business rules, in accordance with an embodiment.

FIG. 5 shows an illustration of a human workflow system that incorporates dynamic human workflow task assignment using business rules, in accordance with an embodiment. As shown in FIG. 5, during normal operation the workflow system and/or logic 190 executes a workflow process, including human workflow tasks 192. As the workflow executes, each task item 194 is associated with a payload 196. The tasks and/or task elements can be assigned to the appropriate users/approvers 200, 202, according to the human workflow process.

In accordance with an embodiment, according to the process designer's configured patterns 212, external business rules 214, as specified by an external business rules system 210, can be used to dynamically modify the human workflow process 218. The tasks and/or task elements can then be assigned to the appropriate users/approvers 220, 222, according to the dynamically modified human workflow.

In this manner, business rules can be abstracted from the modeling of the business process and human workflow, so that users with different roles, such as IT developers, business analysts, etc. can perform different tasks. A workflow task can comprise multiple participants in various patterns, and different business rules engines can be used. Enabling business rules integration at each of these levels allows visibility into which rules are used for which workflow task activities.

Figure 6:
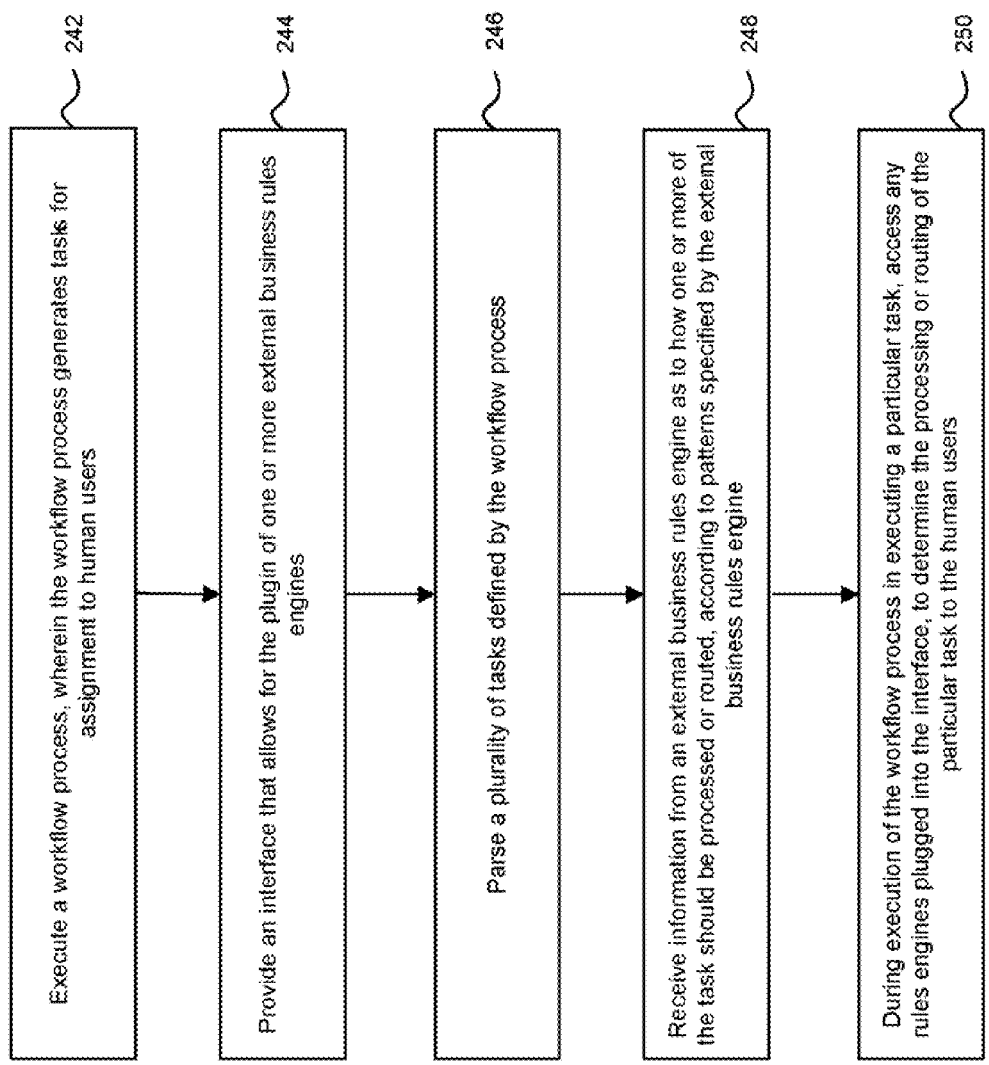
FIG. 6 shows a flowchart of a method for dynamic human workflow task assignment using business rules, in accordance with an embodiment.

FIG. 6 shows a flowchart of a method for dynamic human workflow task assignment using business rules, in accordance with an embodiment. As shown in FIG. 6, in step 242, a system such as a computer executes a workflow process, wherein the workflow process generates tasks for assignment to human users. In step 244, the system provides an interface that allows for the plugin of one or more external business rules engines. In step 246, as the workflow process executes, it parses a plurality of tasks defined by the workflow. In step 248, the system receives information from an external business rules engine as to how one or more of the task should be processed or routed, according to patterns specified by the external business rules engine, and in step 250, during execution of the workflow process in executing a particular task, the system accesses any rules engines plugged into the interface, to determine the processing or routing of the particular task to the human users.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. In particular, although several of the embodiments described above illustrate the use of the Oracle Human Workflow system, and the use of BPEL, it will be evident that other human workflow or workflow systems, and other flow languages can be used. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for dynamic workflow task assignment using business rules, comprising:
   a repository;
   a graphical user interface (GUI) for defining one or more business process execution language (BPEL) process definitions each including a set of tasks and each usable to define a workflow process,
   wherein the one or more BPEL process definitions are persisted in the repository;
   a computer including a workflow process executing thereon, wherein the workflow process generates tasks for assignment to users according to patterns of a workflow defined by a BPEL process definition,
   wherein the tasks are accessible to the assigned users via a client connected with the system;
   a plurality of tasks generated by the workflow process, wherein each task from the plurality of tasks is represented by an object stored in the repository,
   wherein each task from the plurality of tasks includes one or more stages and a payload that includes real-time data necessary to complete the task, and
   wherein a payload for a task from the plurality of tasks is modifiable during the workflow process, including in response to execution of any of the plurality of tasks, and the payload as modified travels with the task as the task is assigned to users responsible for completing the task;
   a business rules service component architecture (SCA) interface that allows for a plurality of business rules engines to each be selectively made accessible to the workflow process via a plugin,
   wherein each of the plurality of business rules engines specifies rules that control how tasks should be processed or routed,
   wherein the plurality of business rules engines specify rules specific to roles within an organization and each of the plurality of business rules engines is associated with a different role within an organization, and
   wherein each of the plurality of tasks is assigned to one or more roles; and
   wherein during execution of the workflow process, the system accesses one or more business rules engines of the plurality of business rules engines plugged into the business rules SCA interface according to one or more roles assigned to a particular task that is being executed to determine processing or routing of the particular task to users, including using rules specified by the one or more business rules engines to
      determine the patterns of the workflow,
      dynamically modify the workflow process based on a payload for the particular task at the time the particular task is executed,
      access a list of users constructed by a list builder for each of one or more stages of the particular task based on the payload for the particular task at the time the particular task is executed,
      assign each of the one or more stages of the particular task to an appropriate user from the list of users according to the dynamically modified workflow process, and
      provide access to each of the one or more stages to an assigned user via a client connected with the system.

2. The system of claim 1, wherein one or more of the plurality of business rules engines are business process engines.

3. The system of claim 2, wherein the rules provided by the plurality of business rules engines are business rules and are used to specify the patterns in a workflow.

4. The system of claim 3, wherein the plurality of business rules engines, and the patterns they specify, control the workflow process to the extent of determining which users should be assigned to which tasks, and the routing thereof.

5. A method for dynamic workflow task assignment using business rules, comprising:
   providing a graphical user interface (GUI) for defining one or more business process execution language (BPEL) process definitions each including a set of tasks and each usable to define a workflow process,
   wherein the one or more BPEL process definitions are persisted in a repository;
   executing, by a computer including a microprocessor, a workflow process, wherein the workflow process generates tasks for assignment to users according to patterns of a workflow defined by a BPEL process definition, wherein the tasks are accessible to the assigned users via a client connected with the system;

parsing a plurality of tasks generated by the workflow process, wherein each task from the plurality of tasks is represented by an object stored in the repository, wherein each task from the plurality of tasks includes one or more stages and a payload that includes real-time data necessary to complete the task, and wherein a payload for a task from the plurality of tasks is modifiable during the workflow process, including in response to execution of any of the plurality of tasks, and the payload as modified travels with the task as the task is assigned to users responsible for completing the task;

providing a business rules service component architecture (SCA) interface that allows for a plurality of business rules engines to each be made accessible to the workflow process via a plugin, wherein each of the plurality of business rules engines specifies rules that control how tasks should be processed or routed, wherein the plurality of business rules engines specify rules specific to roles within an organization and each of the plurality of business rules engines is associated with a different role, and wherein each of the plurality of tasks is assigned to one or more roles; and during execution of the workflow process, accessing one or more business rules engines of the plurality of business rules engines plugged into the business rules SCA interface according to one or more roles assigned to a particular task that is being executed to determine processing or routing of the particular task to users, including using rules specified by the one or more business rules engines to determine the patterns of the workflow, dynamically modify the workflow process based on a payload for the particular task at the time the particular task is executed, access a list of users constructed by a list builder for each of one or more stages of the particular task based on the payload for the particular task at the time the particular task is executed, assign each of the one or more stages of the particular task to an appropriate user from the list of users according to the dynamically modified workflow process, and provide access to each of the one or more stages to an assigned user via a client connected with the system.

6. The method of claim 5, wherein one or more of the plurality of business rules engines are business process engines.

7. The method of claim 6, wherein the rules provided by the plurality of business rules engines are business rules and are used to specify the patterns in a workflow.

8. The method of claim 7, wherein the plurality of business rules engines, and the patterns they specify, control the workflow process to the extent of determining which users should be assigned to which tasks, and the routing thereof.

9. A non-transitory computer readable storage medium, including instructions stored thereon, which when read and executed by a computer cause the computer to perform the steps comprising:

providing a graphical user interface (GUI) for defining one or more business process execution language (BPEL) process definitions each including a set of tasks and each usable to define a workflow process, wherein the one or more BPEL process definitions are persisted in a repository;

executing a workflow process, wherein the workflow process generates tasks for assignment to users according to patterns of a workflow defined by a BPEL process definition, wherein the tasks are accessible to the assigned users via a client connected with the system;

parsing a plurality of tasks generated by the workflow process, wherein each task from the plurality of tasks is represented by an object stored in the repository, wherein each task from the plurality of tasks includes one or more stages and a payload that includes real-time data necessary to complete the task, and wherein a payload for a task from the plurality of tasks is modifiable during the workflow process, including in response to execution of any of the plurality of tasks, and the payload as modified travels with the task as the task is assigned to users responsible for completing the task;

providing a business rules service component architecture (SCA) interface that allows a plurality of business rules engines to each be made accessible to the workflow process via a plugin, wherein each of the plurality of business rules engines specifies rules that control how tasks should be processed or routed, wherein the plurality of business rules engines specify rules specific to roles within an organization and each of the plurality of business rules engines is associated with a different role, and wherein each of the plurality of tasks is assigned to one or more roles; and during execution of the workflow process, accessing one or more business rules engines of the plurality of business rules engines plugged into the business rules SCA interface according to one or more roles assigned to a particular task that is being executed to determine processing or routing of the particular task to users, including using rules specified by the one or more business rules engines to determine the patterns of the workflow, dynamically modify the workflow process based on a payload for the particular task at the time the particular task is executed, access a list of users constructed by a list builder for each of one or more stages of the particular task based on the payload for the particular task at the time the particular task is executed, assign each of the one or more stages of the particular task to an appropriate user from the list of users according to the dynamically modified workflow process, and provide access to each of the one or more stages to an assigned user via a client connected with the system.

10. The non-transitory computer readable storage medium of claim 9, wherein one or more of the plurality of business rules engines are business process engines.

11. The non-transitory computer readable storage medium of claim 10, wherein the rules provided by the plurality of business rules engines are business rules and are used to specify the patterns in a workflow.

12. The non-transitory computer readable storage medium of claim 11, wherein the plurality of business rules engines, and the patterns they specify, control the workflow process to the extent of determining which users should be assigned to which tasks, and the routing thereof.

13. The system of claim 1, wherein the contents of the payload of a particular task are initially provided when the particular task is first created, and can be one of statically defined by workflow system data, or dynamically modified during the workflow process, and wherein the payload as retrieved or modified then travels with the particular task as it is assigned to users responsible for completing the particular task.

14. The method of claim 5, wherein the contents of the payload of a particular task are initially provided when the particular task is first created, and can be one of statically defined by workflow system data, or dynamically modified during the workflow process, and wherein the payload as retrieved or modified then travels with the particular task as it is assigned to users responsible for completing the particular task.

15. The non-transitory computer readable storage medium of claim 9, wherein the contents of the payload of a particular task are initially provided when the particular task is first created, and can be one of statically defined by workflow system data, or dynamically modified during the workflow process, and wherein the payload as retrieved or modified then travels with the particular task as it is assigned to users responsible for completing the particular task.

* * * * *

UNITED STATES PATENT AND TRADEMARK OFFICE
CERTIFICATE OF CORRECTION

PATENT NO. : 9,852,382 B2
APPLICATION NO. : 12/780356
DATED : December 26, 2017
INVENTOR(S) : Rangaswamy et al.

It is certified that error appears in the above-identified patent and that said Letters Patent is hereby corrected as shown below:

On the Title Page

On Page 2

Column 2, under Other Publications, Line 19, delete "Hamburn-Hamburg" and insert
-- Hamburg-Hamburg --, therefor.

In the Drawings

On sheet 1 of 6, in FIGURE 1, under Reference Numeral 82, Line 3, delete "Tast" and insert
-- Task --, therefor.

On sheet 1 of 6, in FIGURE 1, under Reference Numeral 82, Line 4, delete "Servi ce" and insert
-- Service --, therefor.

In the Specification

Column 1, Line 36, delete "Ser.No." and insert -- Ser. No. --, therefor.

Column 3, Line 43, delete "in" and insert -- In --, therefor.

Column 4, Line 19, delete "BMPN" and insert -- BPMN --, therefor.

Signed and Sealed this
Second Day of July, 2019

Andrei Iancu
*Director of the United States Patent and Trademark Office*